(12) United States Patent
Zhao

(10) Patent No.: US 9,243,123 B2
(45) Date of Patent: Jan. 26, 2016

(54) β-CRYSTAL FORM NUCLEATING AGENT COMPOSITION FOR POLYPROPYLENE AND USE THEREOF

(71) Applicant: GCH TECHNOLOGY CO., LTD., Guangzhou (CN)

(72) Inventor: Wen lin Zhao, Guangzhou (CN)

(73) Assignee: GCH TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 14/369,967

(22) PCT Filed: Dec. 21, 2012

(86) PCT No.: PCT/CN2012/087122
§ 371 (c)(1),
(2) Date: Jun. 30, 2014

(87) PCT Pub. No.: WO2013/097647
PCT Pub. Date: Jul. 4, 2013

(65) Prior Publication Data
US 2014/0364553 A1  Dec. 11, 2014

(30) Foreign Application Priority Data
Dec. 31, 2011  (CN) .......................... 2011 1 0456692

(51) Int. Cl.
*C08K 5/098*  (2006.01)
*C08K 3/26*  (2006.01)
*C08K 3/34*  (2006.01)
C08L 23/10  (2006.01)

(52) U.S. Cl.
CPC . *C08K 5/098* (2013.01); *C08K 3/26* (2013.01); *C08K 3/34* (2013.01); C08K 2003/265 (2013.01); C08L 23/10 (2013.01); C08L 2205/242 (2013.01)

(58) Field of Classification Search
CPC ............ C08K 5/098; C08K 3/26; C08K 3/34; C08K 2003/265; C08L 23/10; C08L 23/12; C08L 23/14; C08L 53/00
USPC ................... 524/492, 392; 106/465, 469, 467
See application file for complete search history.

(56) References Cited

U.S. PATENT DOCUMENTS

| 3,562,790 A | 2/1971 | Coover et al. |
| 5,231,126 A | 7/1993 | Shi et al. |
| 5,681,922 A | 10/1997 | Wolfschwenger et al. |
| 2008/0004384 A1* | 1/2008 | Wolters et al. ................ 524/285 |

FOREIGN PATENT DOCUMENTS

| CN | 1004076 B | 5/1989 |
| CN | 1210103 A | 3/1999 |
| CN | 1114651 C | 7/2003 |
| CN | 1944515 A | 4/2007 |
| CN | 101157771 A | 4/2008 |
| CN | 101265342 A | 9/2008 |
| CN | 101429259 A | 5/2009 |
| CN | 102181092 A | 9/2011 |
| CN | 102558683 A | 7/2012 |
| DE | 3610644 A1 | 10/1986 |
| EP | 0682066 A1 | 11/1995 |
| EP | 0887375 A1 | 12/1998 |
| EP | 0887475 A1 | 12/1998 |
| WO | WO 2008/005143 A1 | 1/2008 |
| WO | WO2013/097647 * | 4/2013 |

OTHER PUBLICATIONS

International Searching Authority, International Search Report for International Application No. PCT/CN2012/087122, Mar. 21, 2013, 7 pages, State Intellectual Property Office of the PRC, China.

* cited by examiner

*Primary Examiner* — James J Seidleck
*Assistant Examiner* — Deve E Valdez
(74) *Attorney, Agent, or Firm* — Alston & Bird LLP

(57) ABSTRACT

Disclosed are a β-crystal form nucleating agent composition for polypropylene and an application thereof. The composition is prepared by proportionally mixing barium tetrahydrophthalate, calcium tetrahydrophthalate and the like with adjuvants, such as hydrotalcite or calcium carbonate. The composition has better functions than a single-component β-nucleating agent. The impact strength of polypropylene subjected to nucleation modification by the β-crystal form nucleating agent composition can be improved by up to 6 times, and the heat distortion temperature is improved by about 10° C. to 20° C.; in addition, while the impact strength is improved, the flexural modulus of polypropylene can be improved, namely, the rigidity of polypropylene is improved. Therefore, the mechanical and thermal properties of polypropylene are improved. The use amount of the composition is low, and the application range of polypropylene is expanded; the β-crystal form nucleating agent composition for polypropylene can be widely used in the processing application of polypropylene resin.

7 Claims, No Drawings

β-CRYSTAL FORM NUCLEATING AGENT COMPOSITION FOR POLYPROPYLENE AND USE THEREOF

CROSS REFERENCE TO RELATED APPLICATIONS

This application is a national stage application, filed under 35 U.S.C. §371, of International Application No. PCT/CN2012/087122, filed Dec. 21, 2012, which claims priority to Chinese Application No. 201110456692.7, filed Dec. 31, 2011, the contents of both of which as are hereby incorporated by reference in their entirety.

BACKGROUND

1. Technical Field

The present invention generally relates to nucleating agent compositions and, more particularly, to a β-crystal form nucleating agent composition for polypropylene and use thereof.

2. Description of Related Art

Due to desirable tensile strength, compression strength, rigidity and folding resistance, polypropylene has been widely used in packaging containers, household appliances, automobile components and tubular products to substitute some engineering plastics, such as ABS. Moreover, polypropylene has small density and desirable processing and molding properties. However, compared with engineering plastics, polypropylene has lower heat distortion temperature and undesirable impact resistance, particularly low temperature impact resistance, which limits the further popularization of polypropylene. Therefore, in recent years, efforts have been focused on modification of polypropylene at home and abroad.

As known in the art, blend and multiphase copolymerization have been used to improve the impact properties of polypropylene. For instance, U.S. Pat. No. 3,562,790 disclosed a polymer blend having desirable impact strength and transparency. However, other properties of polypropylene, for instance rigidity, heat resistance property and processing performance are adversely affected. β-crystal form polypropylene belongs to hexagonal system and has desirable impact toughness and high heat distortion temperature, which can be used to overcome the disadvantages of copolymerized polypropylene. Appropriate melting temperature, crystallization temperature, temperature gradient, stress and nucleating agent are necessary conditions to obtain β-crystal form polypropylene resin, wherein adding β-crystal form nucleating agent into polypropylene is one of the simplest way. Adding β-crystal form nucleating agent to polypropylene can remarkably improve the crystallization temperature and crystallization rate of polypropylene and, subsequently, improve the content of β-crystal form polypropylene in polypropylene and improve the impact resistance of polypropylene.

DE-A-3610644, EP0682066, CN1004076B, EP0887475, CN1210103, CN1114651C and CN102181092A disclose various aspects of β-crystal form nucleating agents. However, none of these prior arts provides suggestion that adjuvant can be used to improve properties of the nucleating agent, or adjuvant(s) can be used to overcome the disadvantage in prior art that the flexural modulus of polypropylene will reduce when the amount of the β-crystal form nucleating agent being added increases.

Generally, there are two ways to add nucleating agent. One way is melt blending, as disclosed in CN 1944515A, wherein the formula containing β-crystal form nucleating agent is added to polypropylene resin and, then β-crystal form polypropylene composition is obtained via extrusion granulation. The other way is to add nucleating agent during polymerization process, as disclosed in CN 101429259A, wherein dried β-crystal form nucleating agent is added to a reaction kettle for bulk polymerization or for slurry polymerization. The bulk polymerization or slurry polymerization of propylene is catalyzed by Ziegler-Natta catalytic system to obtain composite powder of polypropylene and β-crystal form nucleating agent. The composite powder is heated or extruded via an extruding machine, to obtain β-crystal form polypropylene resin. Melt blending is widely used due to simple progress. However, the use amount of nucleating agent in melt blending is high and the components can hardly disperse evenly. Adding nucleating agent during polymerization process is very complicated and is rarely used in actual production.

The other disadvantage of using β-crystal form nucleating agent in prior art is although β-crystal form nucleating agent can improve the impact strength of the polypropylene, it will lead to reduction of one of the other key mechanical properties of polypropylene, i.e. flexural modulus. The rigidity of polypropylene will reduce when amount of β-crystal form nucleating agent added increases.

BRIEF SUMMARY

One object of the present invention is to provide a β-crystal form nucleating agent composition having desirable dispersion which can be used in polypropylene to improve properties of polypropylene.

The other object of the present invention is to provide a use of the β-crystal form nucleating agent composition of the present invention in polypropylene.

In accordance with one embodiment of the present invention a β-crystal form nucleating agent composition for polypropylene is provided. The composition includes a β-crystal form nucleating agent carboxylic acid metal salt of tetrahydrophthalic anhydride and at least one adjuvant selected from the group consisting of calcium carbonate, hydrotalcite and talc powder.

According to one aspect of the present invention, the carboxylic acid metal salt of tetrahydrophthalic anhydride conforms to the structure below:

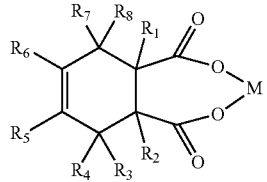

wherein R1, R2, R3, R4, R5, R6, R7, and R8 are either the same or different and being individually selected the group consisting of hydrogen, C1-C9 alkyl, hydroxyl, phenyl, alkyl phenyl and halogen, and M is a metal cation.

According to one aspect of the present invention, the carboxylic acid metal salt of tetrahydrophthalic anhydride is barium tetrahydrophthalate, calcium tetrahydrophthalate, magnesium tetrahydrophthalate, strontium tetrahydrophthalate, zinc tetrahydrophthalate, or 4-methyl-calcium tetrahydrophthalate.

According to one aspect of the present invention, the composition includes 5-95 wt % carboxylic acid metal salt of tetrahydrophthalic anhydride and 5-95 wt % adjuvant selected from the group consisting of calcium carbonate, hydrotalcite and talc powder.

According to one aspect of the present invention, the composition includes 30-95 wt % carboxylic acid metal salt of tetrahydrophthalic anhydride and 5-70 wt % adjuvant selected from the group consisting of calcium carbonate, hydrotalcite and talc powder.

According to one aspect of the present invention, the composition includes 50-95 wt % carboxylic acid metal salt of tetrahydrophthalic anhydride and 5-50 wt % adjuvant selected from the group consisting of calcium carbonate, hydrotalcite and talc powder.

According to one aspect of the present invention, the composition includes 70-95 wt % carboxylic acid metal salt of tetrahydrophthalic anhydride and 5-30 wt % adjuvant selected from the group consisting of calcium carbonate, hydrotalcite and talc powder.

According to one embodiment of the present invention, the β-crystal form nucleating agent composition for polypropylene as previously discussed can be used in polypropylene, wherein the β-crystal form nucleating agent composition is provided in a concentration of 0.05-0.5% by weight of polypropylene.

According to one aspect of the present invention, polypropylene is homopolymer polypropylene or ethylene propylene copolymer.

According to one aspect of the present invention, polypropylene is a polypropylene tube material having a melt flow rate of 0.2-0.5 g/10 min, or a polypropylene having a melt flow rate of 2-15 g/10 min.

Compared with the prior art, the use amount of the β-crystal form nucleating agent composition for polypropylene according to the present invention is low in polypropylene resin and can disperse evenly in polypropylene resin, which not only can remarkably improve the impact strength and the heat distortion temperature of polypropylene, but also can improve the flexural modulus of polypropylene, therefore, can facilitate wide use of the β-crystal form polypropylene resin.

DETAILED DESCRIPTION OF VARIOUS EMBODIMENTS

The carboxylic acid metal salt of tetrahydrophthalic anhydride in the present invention is obtained via reaction between tetrahydrophthalic anhydride and corresponding metallic hydroxides or metallic oxides, or between sodium salt of tetrahydrophthalic anhydride and corresponding melt salt. The preparation process of carboxylic acid metal salt of tetrahydrophthalic anhydride obtained via reaction between tetrahydrophthalic anhydride and corresponding metallic hydroxides or metallic oxides includes the steps of: proportionally adding water, tetrahydrophthalic anhydride into a container to obtain a mixture; stirring the mixture and heating up the mixture to 80-85° C.; slowly adding corresponding metallic hydroxides or metallic oxides into the container after full dissolution of tetrahydrophthalic anhydride; further stirring the mixture for about 2-3 hours and collecting solid carboxylic acid metal salt of tetrahydrophthalic anhydride.

The preparation process of carboxylic acid metal salt of tetrahydrophthalic anhydride obtained via reaction between sodium salt of tetrahydrophthalic anhydride and corresponding melt salt includes the steps of: proportionally adding water, tetrahydrophthalic anhydride into a container to obtain a mixture; stirring the mixture and heating up the mixture to 80-85° C.; slowly adding sodium hydroxide into the container after full dissolution of tetrahydrophthalic anhydride; further stirring the solution until the solution become transparent; slowly adding melt salt into the solution and further stirring the solution for about 2-3 hours and collecting solid carboxylic acid metal salt of tetrahydrophthalic anhydride.

The preparation process of barium/calcium/aluminum tetrahydrophthalate includes the steps of: 1) adding 250 ml water, 15.2 g tetrahydrophthalic anhydride into a 500 ml container having an electric mixer to obtain a mixture; stirring the mixture and heating up the mixture to 80-85° C.; slowly adding 7.01 g calcium hydroxide/8.1 g zinc oxide/17.1 g barium hydroxide into the container respectively after full dissolution of the tetrahydrophthalic anhydride and further stirring the mixture for about 2-3 hours; collecting white solid via suction filtration and washing the white solid; drying the white solid in a constant temperature drying oven at a temperature of 110-145° C. for about 3-4 hours; and obtaining white powder of barium/calcium/aluminum tetrahydrophthalate after crushing. 2) adding 250 ml water, 15.2 g tetrahydrophthalic anhydride into a 500 ml container having an electric mixer to obtain a mixture; stirring the mixture and heating up the mixture to 80-85° C.; slowly adding 0.8 g sodium hydroxide into the mixture after full dissolution of the tetrahydrophthalic anhydride; stirring the mixture until the solution become transparent; slowly adding 11.1 g calcium chloride/13.6 g zinc oxide/20.8 g barium chloride respectively and generating white sedimentation; further stirring for about 2-3 hours; collecting white solid via suction filtration and washing the white solid; drying the white solid in a constant temperature drying oven at a temperature of 110-145° C. for about 3-4 hours; and obtaining white powder of barium/calcium/aluminum tetrahydrophthalate after crushing.

Since the preparation of barium tetrahydrophthalate, calcium tetrahydrophthalate, and aluminum tetrahydrophthalate each is similar to that of the preparation of the four metallic salts of carboxylate of tetrahydrophthalic anhydride as detailed above except for the raw materials. Therefore, the preparation of barium tetrahydrophthalate, calcium tetrahydrophthalate, and aluminum tetrahydrophthalate will not be further detailed.

Chinese patent number CN 102181092A discloses carboxylic acid metal salt of tetrahydrophthalic anhydride, such as PA4-Ba (barium tetrahydrophthalate) and PA4-Ca (calcium tetrahydrophthalate) as nucleating agent, however, CN 102181092A only discloses the single-component nucleating agents as disclosed previously, it fails to provide any suggestion that efficiency of the nucleating agent can be improved after addition of adjuvant, so as to overcome reduction of the flexural modulus when the amount of addition of β-crystal form nucleating agent increases. After experiments, inventor of the present invention finds that, proportional addition of adjuvants such as calcium carbonate, hydrotalcite and talc powder can reduce the use amount of the β-crystal form nucleating agent, and the flexural modulus of polypropylene will not reduce when the amount of addition of β-crystal form nucleating agent increases. At the same time, the impact strength and the heat distortion temperature of polypropylene is also improved remarkably. Therefore, application range of polypropylene modified by the β-crystal form nucleating agent composition is expanded.

According to one embodiment of the present invention, the nucleating agent composition is added to polypropylene and extruded via an extruding machine to obtain β-crystal form polypropylene resin master batch or obtain β-crystal form polypropylene article via extruding and molding.

Various embodiments of the present invention will be described more fully, in which some, but not all embodiments of the present invention are shown. Indeed, embodiments of the present invention may be embodied in many different forms and should not be construed as limited to the embodiments set forth herein. Rather, these embodiments are provided so that this disclosure will satisfy applicable legal requirements.

The polypropylene (PP) used in the tests is F401 available from Yangzi Petrochemical Co., Ltd. The hydrotalcite product AC-207 used in the tests is available from GCH Technology Co., Ltd. The barium tetrahydrophthalate PA4-Ba is available from GCH Technology Co., Ltd. The calcium tetrahydrophthalate PA4-Ca is available from GCH Technology Co., Ltd.

PREPARATION OF SAMPLES

Preparation of Sample 1

500 ppm, 700 ppm, 1000 ppm nucleating agent PA4-Ba are added into 1000 g PP (F401) respectively. Mixtures of the PP (F401) and different levels of the nucleating agent PA4-Ba each is mixed in a high speed mixer for 5 minutes. The mixed mixtures each is extruded via a double screw rod extruding machine to obtain standard PP (F401) samples after injection molding. In the preparation of Sample 1, the extrusion temperature is 210° C., and the temperatures in each section of the injection molding machine ranges from 220° C. to 230° C.

Preparation of Sample 2

Nucleating agent compositions (PA4-Ba+ calcium carbonate) including 500 ppm PA4-Ba and 500 ppm calcium carbonate, 700 ppm PA4-Ba and 300 ppm calcium carbonate, 900 ppm PA4-Ba and 100 ppm calcium carbonate are added into 1000 g PP (F401) respectively. Mixtures of the PP (F401) and different levels of the nucleating agent compositions each is mixed in a high speed mixer for 5 minutes. The mixed mixtures each is extruded via a double screw rod extruding machine to obtain standard PP (F401) samples after injection molding. In the preparation of Sample 2, the extrusion temperature is 210° C., and the temperatures in each section of the injection molding machine ranges from 220° C. to 230° C.

Preparation of Sample 3

Nucleating agent compositions (PA4-Ba+AC-207) including 500 ppm PA4-Ba and 500 ppm AC-207, 700 ppm PA4-Ba and 300 ppm AC-207, 900 ppm PA4-Ba and AC-207 are added into 1000 g PP (F401) respectively. Mixtures of the PP (F401) and different levels of the nucleating agent compositions each is mixed in a high speed mixer for 5 minutes. The mixed mixtures each is extruded via a double screw rod extruding machine to obtain standard PP (F401) samples after injection molding. In the preparation of Sample 3, the extrusion temperature is 210° C., and the temperatures in each section of the injection molding machine ranges from 220° C. to 230° C.

Preparation of Sample 4

Nucleating agent compositions (PA4-Ba+ talc powder) including 500 ppm PA4-Ba and 500 ppm talc powder, 700 ppm PA4-Ba and 300 ppm talc powder, 900 ppm PA4-Ba and talc powder are added into 1000 g PP (F401) respectively. Mixtures of the PP (F401) and different levels of the nucleating agent compositions each is mixed in a high speed mixer for 5 minutes. The mixed mixtures each is extruded via a double screw rod extruding machine to obtain standard PP (F401) samples after injection molding. In the preparation of Sample 4, the extrusion temperature is 210° C., and the temperatures in each section of the injection molding machine ranges from 220° C. to 230° C.

Preparation of Comparative Sample

To illustrate the technical effects of the embodiments according to the present invention, blank standard comparative samples having the same heat history and under the same condition as in the preparation of the previously described samples are prepared. Properties of the Samples and the Comparative Samples are compared and illustrated in the Tables as below.

Tests of Mechanical Properties and Thermal Properties

Tests of the modified polypropylene are carried out according to Chinese national standards GB 2918-1998 at a temperature of $(23\pm2)°$ C. and a relative humidity of $50\pm5\%$. The time for adjusting the status of the Samples is 48 hours. The physical property tests are respectively carried out according to Chinese national standards, i.e. GB/T 1843-1996 for notched Izod impact strength, GB/T 1634-2004 for heat distortion temperature, and GB/T 9341-2000 for flexural properties. The test results are shown in Table 1 and Table 2.

TABLE 1

Impact strength, flexural modules and heat distortion temperature of PP (F401) before and after modification of β-crystal form nucleating agent PA4-Ba

| Samples | Amount of nucleating agent added ppm | Impact strength kJ/m$^2$ | Flexural modules MPa | Heat distortion temperature ° C. |
|---|---|---|---|---|
| Comparative sample | 0 | 4.0 | 1160 | 84.7 |
| Sample 1 | 500 | 25.8 | 1100 | 99.0 |
|  | 700 | 25.9 | 1070 | 101.6 |
|  | 1000 | 26.9 | 1062 | 103.4 |

Table 1 clearly shows that addition of β-crystal form nucleating agent PA4-Ba can improve the impact strength of polypropylene. However, when the amount of the nucleating agent PA4-Ba added increases, the impact strength of polypropylene will reduce about 10%, which significantly limits the application of the polypropylene article.

TABLE 2

Impact strength, flexural modules and heat distortion temperature of PP (F401) before and after modification of β-crystal form nucleating agent compositions (PA4-Ba + calcium carbonate), (PA4-Ba + AC-207), and (PA4-Ba + talc powder)

| Samples | Amount of nucleating agent PA4-Ba added ppm | Amount of adjuvant added ppm | Impact strength kJ/m$^2$ | Flexural modules MPa | Heat distortion temperature ° C. |
|---|---|---|---|---|---|
| Comparative sample | 0 | 0 | 4.0 | 1160 | 84.7 |
| Sample 2 | 500 | 500 | 25.6 | 1293 | 105.5 |
|  | 700 | 300 | 26.3 | 1238 | 103.9 |
|  | 900 | 100 | 26.9 | 1194 | 100.2 |

TABLE 2-continued

Impact strength, flexural modules and heat distortion temperature of PP (F401) before and after modification of β-crystal form nucleating agent compositions (PA4-Ba + calcium carbonate), (PA4-Ba + AC-207), and (PA4-Ba + talc powder)

| Samples | Amount of nucleating agent PA4-Ba added ppm | Amount of adjuvant added ppm | Impact strength kJ/m² | Flexural modules MPa | Heat distortion temperature °C. |
|---|---|---|---|---|---|
| Sample 3 | 500 | 500 | 25.9 | 1215 | 104.3 |
|  | 700 | 300 | 26.0 | 1211 | 102.7 |
|  | 900 | 100 | 26.2 | 1178 | 99.6 |
| Sample 4 | 500 | 500 | 25.7 | 1280 | 105.5 |
|  | 700 | 300 | 26.0 | 1225 | 102.7 |
|  | 900 | 100 | 26.3 | 1180 | 100.2 |

Table 2 clearly shows that, the impact strength of the homopolymer polypropylene modified via the β-crystal form nucleating agent composition can be improved by more than 500%, while the flexural modules is also improved when the amount of the β-crystal form nucleating agent added increases, which facilitates the application of polypropylene resin. At the same time, the heat distortion temperature can be improved by about 16-21° C., and the mechanical properties of polypropylene are remarkably improved.

Application Tests of the β-Crystal Nucleating Agent Compositions in Different Polypropylene Base Materials β-crystal nucleating agent compositions present different properties in different polypropylene base materials. Modification effects of the β-crystal nucleating agent compositions to different polypropylene base material will be further illustrated via the experimental data in the Tables below, wherein the samples of the polypropylene base materials are prepared according to the process as previously described.

TABLE 3

Tests of random copolymerized polypropylene 4420 available from Yanshan Petrochemical Corporation modified by β-crystal form nucleating agent composition (PA4-Ba + calcium carbonate)

| Samples | Amount of nucleating agent composition added ppm | Impact strength kJ/m² | Flexural modules MPa | Heat distortion temperature °C. |
|---|---|---|---|---|
| Comparative sample | 0 | 35.0 | 544.2 | 71 |
| Sample 1 | 800 | 78.3 | 566.9 | 80.6 |
| Sample 2 | 1000 | 81.9 | 580.1 | 81.2 |

β-crystal form nucleating agent composition includes 20 wt % PA4-Ba and 80 wt % calcium carbonate Table 3 clearly shows that, the impact strength of the random copolymerized polypropylene modified by the β-crystal form nucleating agent composition (PA4-Ba+ calcium carbonate) is improved by about 124%, the rigidity is improved by about 6.6%, and the heat distortion temperature is improved by about 10° C. The mechanical properties of the random copolymerized polypropylene 4220 are improved remarkably.

TABLE 4

Tests of homopolymer polypropylene PP-1120 available from Formosa Plastics Corporation modified by β-crystal form nucleating agent composition (PA4-Ca + AC-207)

| Samples | Amount of nucleating agent composition added ppm | Impact strength kJ/m² | Flexural modules MPa | Heat distortion temperature °C. |
|---|---|---|---|---|
| Comparative sample | 0 | 2.2 | 1334 | 84.2 |
| Sample 1 | 800 | 15.5 | 1410 | 101.7 |
| Sample 2 | 1000 | 15.1 | 1395 | 101.0 |

β-crystal form nucleating agent composition includes 40 wt % PA4-Ca and 60 wt % AC-207 Table 4 clearly shows that the impact strength of the homopolymer polypropylene modified by β-crystal form nucleating agent composition (PA4-Ca+AC-207) is improved by 586%, the rigidity of the modified polypropylene is also improved slightly, and the heat distortion temperature is improved by about 17° C. The mechanical properties of the homopolymer polypropylene are remarkably improved.

TABLE 5

Tests of homopolymer polypropylene PP-1120 available from Formosa Plastics Corporation modified by β-crystal form nucleating agent composition (PA4-Ca + calcium carbonate)

| Samples | Amount of nucleating agent composition added ppm | Impact strength kJ/m² | Flexural modules MPa | Heat distortion temperature °C. |
|---|---|---|---|---|
| Comparative sample | 0 | 2.2 | 1334 | 84.2 |
| Sample 1 | 800 | 14.2 | 1341 | 100.7 |
| Sample 2 | 1000 | 14.6 | 1400 | 101.0 |

β-crystal form nucleating agent composition includes 40 wt % PA4-Ca and 60 wt % calcium carbonate Table 5 clearly shows that the impact strength and the heat distortion temperature of the homopolymer polypropylene modified by β-crystal form nucleating agent composition (PA4-Ca+ calcium carbonate) are both improved remarkably. The modification effect of the β-crystal form nucleating agent composition (PA4-Ca+ calcium carbonate) is almost the same as that of the β-crystal form nucleating agent composition (PA4-Ca+ hydrotalcite).

Summarizing the above, the β-crystal form nucleating agent compositions obtained via mixing β-crystal form nucleating agent PA4-Ba, PA4-Ca with adjuvant hydrotalcite, calcium carbonate, talc powder respectively, presents desirable properties in different kinds of polypropylene resins. The impact strength and the heat distortion temperature of polypropylene modified by the β-crystal from nucleating agent are remarkably improved. At the same time, the flexural modulus of the modified polypropylene is also improved. Therefore, the modified polypropylene has well-balanced mechanical properties and thermal properties, and the application range of polypropylene is expanded. The β-crystal form nucleating agent composition for polypropylene can used to improve the properties of polypropylene and can be widely used in the processing application of polypropylene resin.

It should be noted that, although the samples and corresponding testing results in the embodiments of the present invention are based on the nucleating agent composition obtained by mixing metal salts of carboxylic acid anhydride with one of the adjuvant hydrotalcite, calcium carbonate and talc powder, it would be obvious to one ordinary skill in the art that, the β-crystal form nucleating agent composition for polypropylene according to the present invention can also be obtained via mixing metal salts of carboxylic acid anhydride with two or three of hydrotalcite, calcium carbonate and talc powder. Additionally, appropriate amount of functional additives, for instance coloring agent and few impurities, can also be added into the nucleating agent composition of the present invention.

While the present invention has been illustrated by the above description of the preferred embodiments thereof, while the preferred embodiments have been described in considerable detail, it is not intended to restrict or in any way limit the scope of the appended claims to such details. Additional advantages and modifications within the spirit and scope of the present invention will readily appear to those ordinary skilled in the art. Consequently, the present invention is not limited to the specific details and the illustrative examples as shown and described.

What is claimed is:

1. A β-crystal form nucleating agent composition for polypropylene, comprising a β-crystal form nucleating agent carboxylic acid metal salt of tetrahydrophthalic anhydride and at least one adjuvant selected from the group consisting of calcium carbonate, hydrotalcite and talc powder.

2. The β-crystal form nucleating agent composition for polypropylene of claim 1, wherein the carboxylic acid metal salt of tetrahydro phthalic anhydride conforms to the structure below:

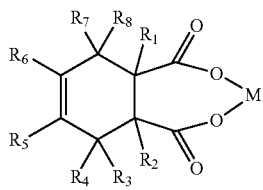

and wherein R1, R2, R3, R4, R5, R6, R7, and R8 are either the same or different and being individually selected from the group consisting of hydrogen, C1-C9 alkyl, hydroxyl, phenyl, alkyl phenyl and halogen, and M is a metal cation.

3. The β-crystal form nucleating agent composition for polypropylene of claim 2, wherein the Carboxylic acid metal salt of tetrahydro phthalic anhydride is at least one of barium tetrahydrophthalate, calcium tetrahydrophthalate, magnesium tetrahydrophthalate, strontium tetrahydrophthalate, zinc tetrahydrophthalate, or 4-methyl-calcium tetrahydrophthalate.

4. The β-crystal form nucleating agent composition for polypropylene of claim 1, wherein the composition comprises 5-95 wt % carboxylic acid metal salt of tetrahydro phthalic anhydride and 5-95 wt % adjuvant being selected from the group consisting of: calcium carbonate, hydrotalcite, and talc powder.

5. The β-crystal form nucleating agent composition for polypropylene of claim 4, wherein the composition comprises 30-95 wt % carboxylic acid metal salt of tetrahydro phthalic anhydride and 5-70 wt % adjuvant being selected from the group consisting of: calcium carbonate, hydrotalcite, and talc powder.

6. The β-crystal form nucleating agent composition for polypropylene of claim 5, wherein the composition comprises 50-95 wt % carboxylic acid metal salt of tetrahydro phthalic anhydride and 5-50 wt % adjuvant being selected from the group consisting of: calcium carbonate, hydrotalcite, and talc powder.

7. The β-crystal form nucleating agent composition for polypropylene of claim 6, wherein the composition comprises 70-95 wt % carboxylic acid metal salt of tetrahydro phthalic anhydride and 5-30 wt % adjuvant being selected from the group consisting of: calcium carbonate, hydrotalcite, and talc powder.

* * * * *